(12) United States Patent
Abedini et al.

(10) Patent No.: US 11,824,817 B2
(45) Date of Patent: Nov. 21, 2023

(54) CROSS-LINK INTERFERENCE SIGNALING FOR INTEGRATED ACCESS AND BACKHAUL

(71) Applicant: QUALCOMM Incorporated, San Diego, CA (US)

(72) Inventors: Navid Abedini, Basking Ridge, NJ (US); Xipeng Zhu, San Diego, CA (US); Tao Luo, San Diego, CA (US); Luca Blessent, Whitehouse Station, NJ (US); Karl Georg Hampel, Hoboken, NJ (US); Jianghong Luo, Skillman, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 17/228,071

(22) Filed: Apr. 12, 2021

(65) Prior Publication Data

US 2021/0359831 A1    Nov. 18, 2021

Related U.S. Application Data

(60) Provisional application No. 63/024,224, filed on May 13, 2020.

(51) Int. Cl.
*H04L 5/14* (2006.01)
*H04W 88/14* (2009.01)

(52) U.S. Cl.
CPC .......... *H04L 5/1461* (2013.01); *H04L 5/1469* (2013.01); *H04W 88/14* (2013.01)

(58) Field of Classification Search
CPC ... H04L 5/1461; H04L 5/1469; H04L 5/0092; H04L 5/001; H04W 88/14; H04W 92/20; H04W 72/23; H04W 72/0446; H04W 84/047; H04W 72/1263; H04W 72/27; H04W 52/0216; H04W 52/0225; H04W 72/20; H04W 72/53; H04W 92/24; H04W 40/04; H04W 72/044; H04W 72/0453; H04W 72/04; H04W 72/1268; H04W 72/21; H04W 72/29; H04W 72/52
See application file for complete search history.

(56) References Cited

U.S. PATENT DOCUMENTS 11,385,323 B2 *  7/2022  Gulati ................ G01S 7/023
2011/0267978 A1 * 11/2011  Etemad ............ H04L 5/0094
                                               370/254

(Continued)

OTHER PUBLICATIONS

Miao U.S. Appl. No. 62/855,494, filed May 31, 2019 (Year: 2019).*

*Primary Examiner* — Wutchung Chu
(74) *Attorney, Agent, or Firm* — Harrity & Harrity, LLP

(57) ABSTRACT

Various aspects of the present disclosure generally relate to wireless communication. In some aspects, a first wireless node may transmit, to a second wireless node, a cross-link interference (CLI) management configuration message including information identifying a time division duplexing configuration of a mobile terminal of a third wireless node; and communicate with one or more wireless nodes in accordance with the time division duplexing configuration of the mobile terminal based at least in part on transmitting the CLI management configuration message to the second wireless node. Numerous other aspects are provided.

31 Claims, 7 Drawing Sheets

(56) References Cited

U.S. PATENT DOCUMENTS

| | | | |
|---|---|---|---|
| 2012/0087396 A1* | 4/2012 | Nimbalker | H04L 1/1835 |
| | | | 375/316 |
| 2020/0229271 A1* | 7/2020 | You | H04W 72/53 |
| 2021/0219155 A1* | 7/2021 | Ye | H04L 5/0048 |
| 2021/0321281 A1* | 10/2021 | Wei | H04B 17/336 |
| 2021/0345321 A1* | 11/2021 | Wu | H04W 16/10 |
| 2021/0367660 A1* | 11/2021 | Jo | H04W 72/53 |
| 2021/0400661 A1* | 12/2021 | Harada | H04B 7/15542 |
| 2022/0007401 A1* | 1/2022 | Harada | H04W 72/20 |
| 2022/0015093 A1* | 1/2022 | Ying | H04B 7/15542 |
| 2022/0061006 A1* | 2/2022 | Liu | H04W 72/23 |
| 2022/0110136 A1* | 4/2022 | Li | H04B 17/345 |
| 2022/0131733 A1* | 4/2022 | You | H04W 88/04 |
| 2022/0132508 A1* | 4/2022 | Novlan | H04W 72/27 |
| 2022/0167290 A1* | 5/2022 | Harada | H04L 5/0048 |
| 2022/0167331 A1* | 5/2022 | Huang | H04W 72/20 |
| 2022/0174528 A1* | 6/2022 | Sedin | H04L 5/0048 |
| 2022/0174668 A1* | 6/2022 | Yuan | H04L 1/1812 |
| 2022/0191832 A1* | 6/2022 | Yokomakura | H04W 72/23 |
| 2022/0191893 A1* | 6/2022 | Miao | H04B 7/15542 |
| 2022/0201656 A1* | 6/2022 | Kurita | H04W 74/0833 |
| 2022/0201767 A1* | 6/2022 | Wei | H04W 16/10 |
| 2022/0217661 A1* | 7/2022 | Yokomakura | H04B 7/155 |
| 2022/0272699 A1* | 8/2022 | Zhuo | H04W 72/27 |
| 2022/0279532 A1* | 9/2022 | Barac | H04W 72/27 |
| 2022/0287123 A1* | 9/2022 | Tiirola | H04W 76/15 |
| 2022/0330176 A1* | 10/2022 | Kowalski | H04W 52/325 |

\* cited by examiner

CROSS-LINK INTERFERENCE SIGNALING FOR INTEGRATED ACCESS AND BACKHAUL

CROSS-REFERENCE TO RELATED APPLICATION

This Patent Application claims priority to U.S. Provisional Patent Application No. 63/024,224, filed on May 13, 2020, entitled "CROSS-LINK INTERFERENCE SIGNALING FOR INTEGRATED ACCESS AND BACKHAULING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for cross-link interference signaling for integrated access and backhaul.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a first wireless node, may include transmitting, to a second wireless node, a cross-link interference (CLI) management configuration message including information identifying a time division duplexing configuration of a mobile terminal of a third wireless node; and communicating with one or more wireless nodes in accordance with the time division duplexing configuration of the mobile terminal based at least in part on transmitting the CLI management configuration message to the second wireless node.

In some aspects, a first wireless node for wireless communication may include memory and one or more processors operatively coupled to the memory. The memory and the one or more processors may be configured to transmit, to a second wireless node, a CLI management configuration message including information identifying a time division duplexing configuration of a mobile terminal of a third wireless node; and communicate with one or more wireless nodes in accordance with the time division duplexing configuration of the mobile terminal based at least in part on transmitting the CLI management configuration message to the second wireless node.

In some aspects, a non-transitory computer-readable medium may store one or more instructions for wireless communication. The one or more instructions, when executed by one or more processors of a first wireless node, may cause the one or more processors to transmit, to a second wireless node, a CLI management configuration message including information identifying a time division duplexing configuration of a mobile terminal of a third wireless node; and communicate with one or more wireless nodes in accordance with the time division duplexing configuration of the mobile terminal based at least in part on transmitting the CLI management configuration message to the second wireless node.

In some aspects, an apparatus for wireless communication may include means for transmitting, to a second wireless node, a CLI management configuration message including information identifying a time division duplexing configuration of a mobile terminal of a third wireless node; and means for communicating with one or more wireless nodes in accordance with the time division duplexing configuration of the mobile terminal based at least in part on transmitting the CLI management configuration message to the second wireless node.

In some aspects, a method of wireless communication, performed by a second wireless node, may include receiving, from a first wireless node, a CLI management configuration message including information identifying a time division duplexing configuration of a mobile terminal of a third wireless node; and communicating with one or more wireless nodes in accordance with the time division duplexing configuration of the mobile terminal based at least in part on receiving the CLI management configuration message from the first wireless node.

In some aspects, a second wireless node for wireless communication may include memory and one or more processors coupled to the memory. The memory and the one or more processors may be configured to receive, from a first wireless node, a CLI management configuration message including information identifying a time division duplexing configuration of a mobile terminal of a third wireless node; and communicate with one or more wireless nodes in accordance with the time division duplexing configuration of the mobile terminal based at least in part on receiving the CLI management configuration message from the first wireless node.

In some aspects, a non-transitory computer-readable medium may store one or more instructions for wireless communication. The one or more instructions, when executed by one or more processors of a second wireless node, may cause the one or more processors to receive, from a first wireless node, a CLI management configuration message including information identifying a time division duplexing configuration of a mobile terminal of a third wireless node; and communicate with one or more wireless nodes in accordance with the time division duplexing configuration of the mobile terminal based at least in part on receiving the CLI management configuration message from the first wireless node.

In some aspects, an apparatus for wireless communication may include means for receiving, from a first wireless node, a CLI management configuration message including information identifying a time division duplexing configuration of a mobile terminal of a third wireless node; and means for communicating with one or more wireless nodes in accordance with the time division duplexing configuration of the mobile terminal based at least in part on receiving the CLI management configuration message from the first wireless node.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
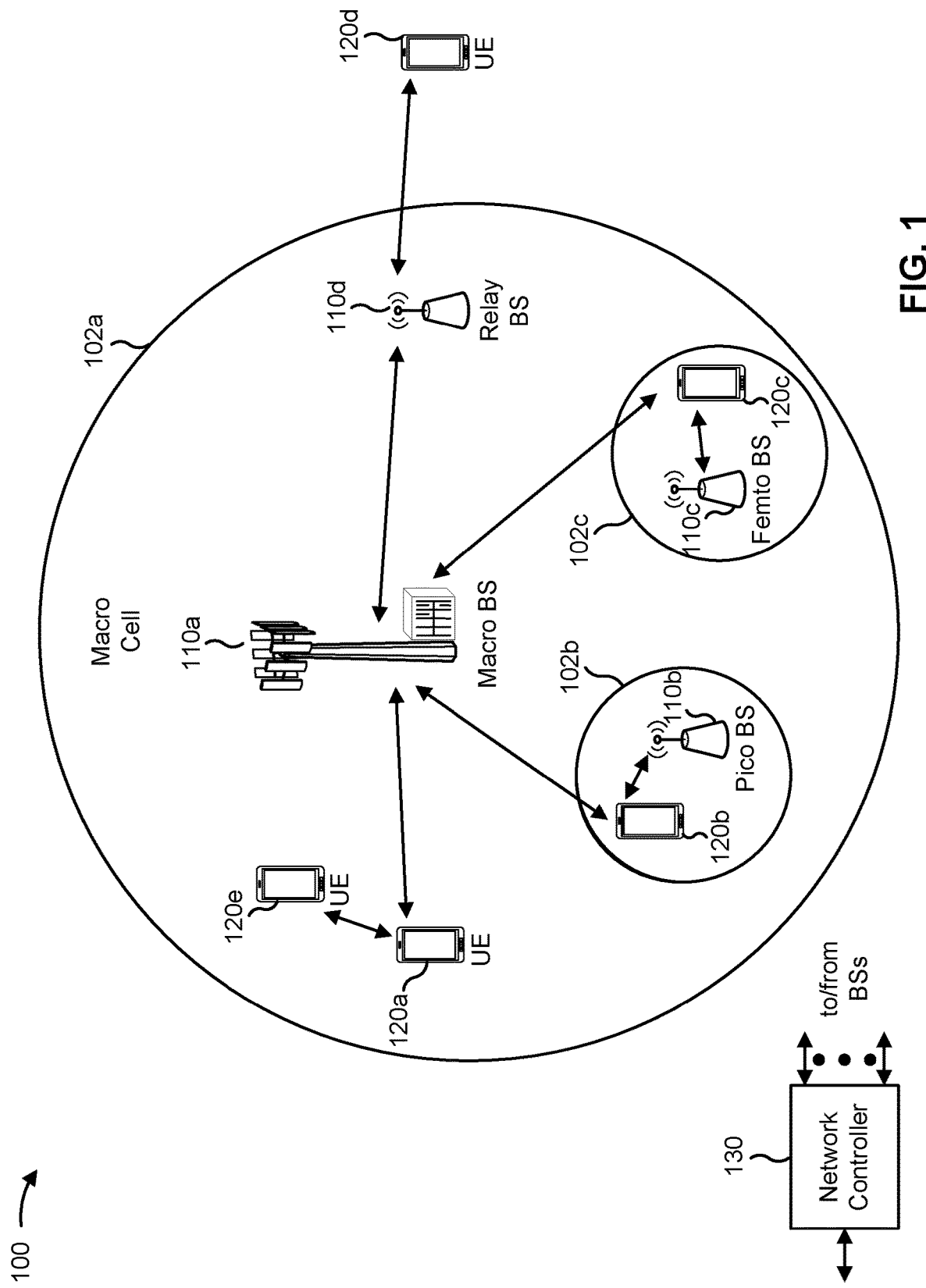
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
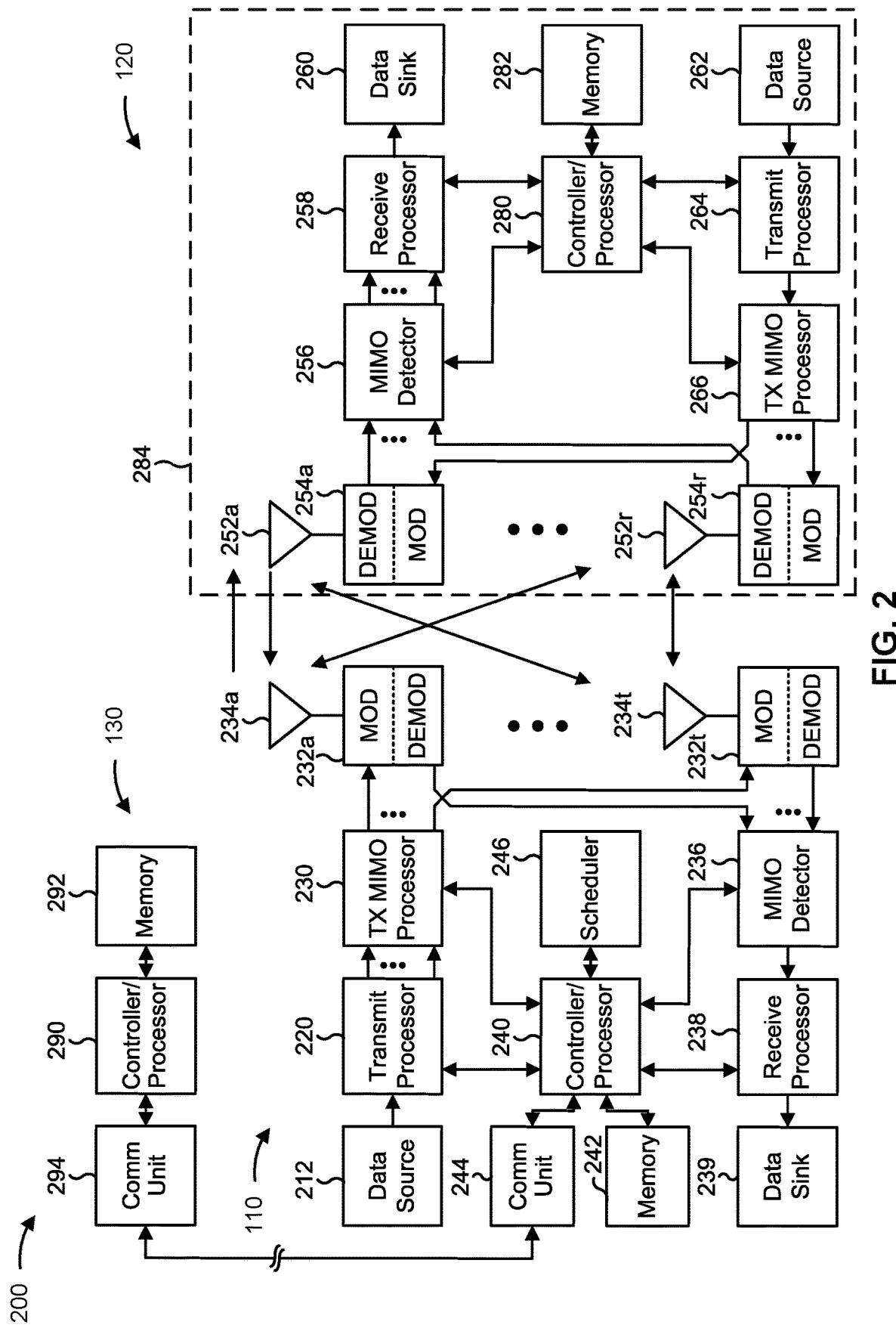
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-7).

Controller/processor 240 of base station 110, controller/processor 280 of UE 120, and/or any other component(s) of FIG. 2 may perform one or more techniques associated with cross-link interference (CLI) signaling for integrated access and backhaul, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, a first wireless node (e.g., the BS 110 and/or the UE 120) may include means for transmitting, to a second wireless node, a cross-link interference (CLI) management configuration message including information identifying a time division duplexing configuration of a mobile terminal of a third wireless node, means for communicating with one or more wireless nodes in accordance with the time division duplexing configuration of the mobile terminal based at least in part on transmitting the CLI management configuration message to the second wireless node, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258, among other examples. In some aspects, such means may include one or more components of BS 110 described in connection with FIG. 2, such as antenna 234, DEMOD 232, MIMO detector 236, receive processor 238, controller/processor 240, transmit processor 220, TX MIMO processor 230, MOD 232, and/or antenna 234, among other examples.

In some aspects, a second wireless node (e.g., the BS 110 and/or the UE 120) may include means for receiving, from a first wireless node, a CLI management configuration message including information identifying a time division duplexing configuration of a mobile terminal of a third wireless node, means for communicating with one or more wireless nodes in accordance with the time division duplexing configuration of the mobile terminal based at least in part on receiving the CLI management configuration message from the first wireless node, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258, among other examples. In some aspects, such means may include one or more components of BS 110 described in connection with FIG. 2, such as antenna 234, DEMOD 232, MIMO detector 236, receive processor 238, controller/processor 240, transmit processor 220, TX MIMO processor 230, MOD 232, and/or antenna 234, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
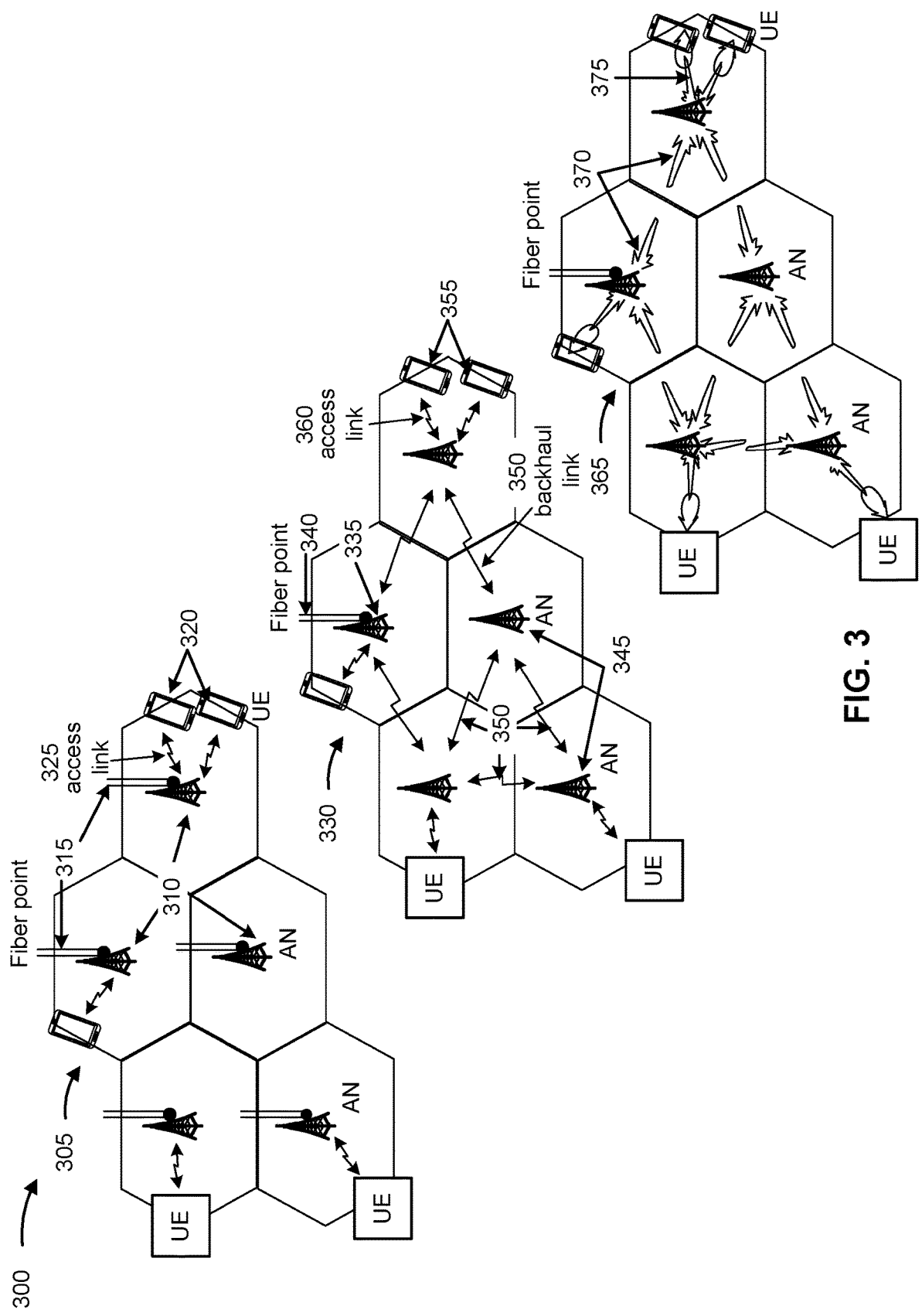
FIG. 3 is a diagram illustrating examples of radio access networks, in accordance with the disclosure.

FIG. 3 is a diagram illustrating examples 300 of radio access networks, in accordance with the disclosure.

As shown by reference number 305, a traditional (e.g., 3G, 4G, and/or LTE) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in 3 may be a base station 110 shown in FIG. 1. In some aspects, a UE 320 shown in 3 may be a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming, among other examples. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in 3 may be replaced by one or more UEs that communicate via a UE-to-UE access network (e.g., a peer-to-peer network, and/or a device-to-device network. In this case, "anchor node" may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
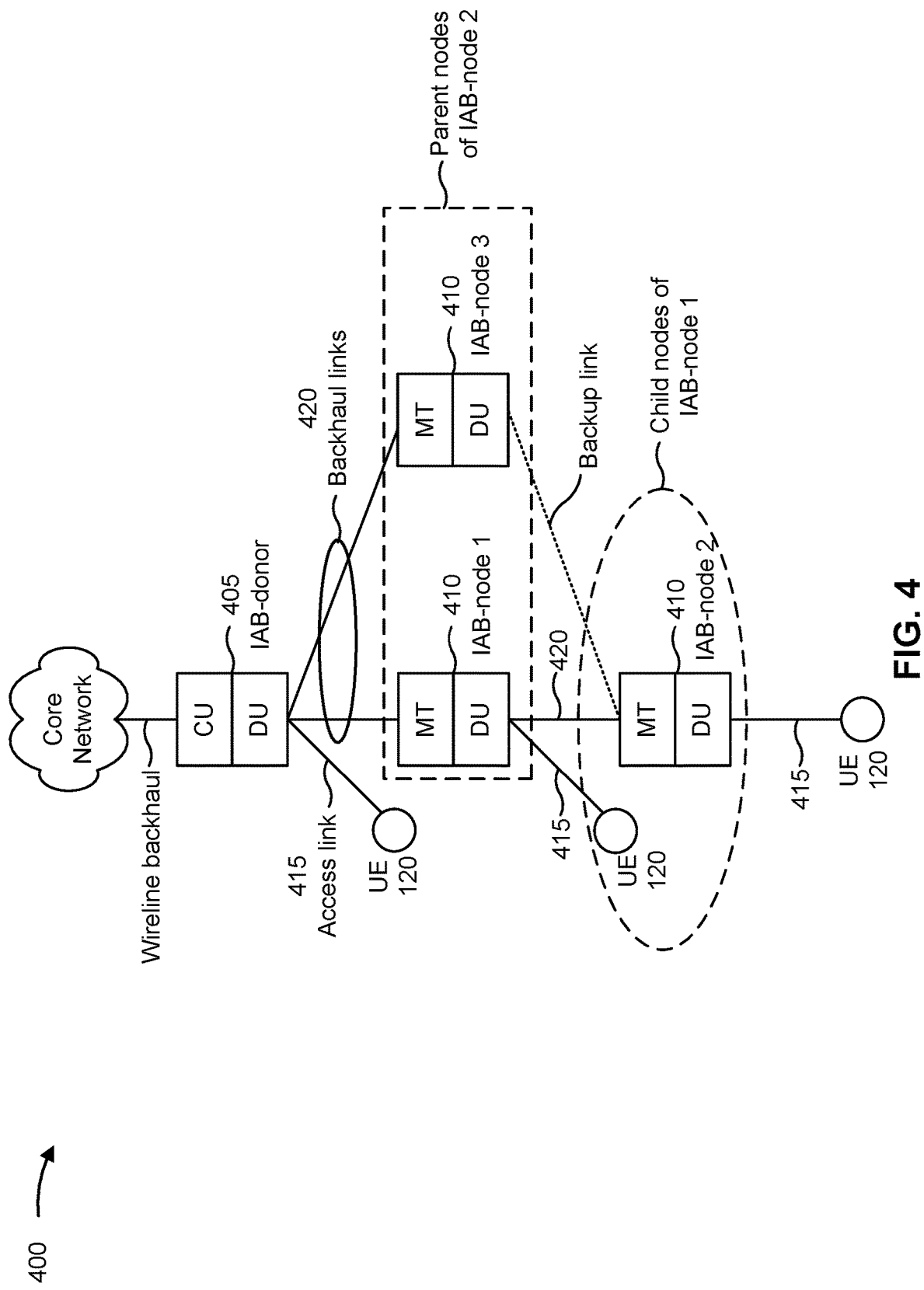
FIG. 4 is a diagram illustrating an example of an integrated access and backhaul (IAB) network architecture, in accordance with the disclosure.

FIG. 4 is a diagram illustrating an example 400 of an IAB network architecture, in accordance with the disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (AMF). In some aspects, an IAB donor 405 may include a base station 110, such as an anchor base station, as described above in connection with FIG. 3. As shown, an IAB donor 405 may include a central unit (CU), which may perform access node controller (ANC) functions, and/or AMF functions. The CU may configure a distributed unit (DU) of the IAB donor 405 and/or may configure one or more IAB nodes 410 (e.g., a mobile termination (MT) and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message, and/or an F1 application protocol (F1AP) message).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include mobile termination (MT) functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in FIG. 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link between IAB-node 2 and IAB-node 3 may be used for backhaul communications if a primary backhaul link between IAB-node 2 and IAB-node 1 fails. As used herein, "node" or "wireless node" may refer to an IAB donor 405 or an IAB node 410.

As indicated above, FIG. 4 is provided as an example. Other examples may differ from what is described with regard to FIG. 4.

Some communications systems may include cross-link interference (CLI) mitigation techniques. For example, on an F1-application protocol (F1-AP) interface between a DU and a CU, the DU may provide an intended time division duplexing (TDD) configuration of one or more cells of the DU. The DU may provide the intended TDD configuration to the CU via an F1 setup message, and/or a gNB-DU configuration update message. Similarly, the CU may provide information identifying a TDD configuration of one or more neighboring cells of the CU. The CU may provide the intended TDD configuration to the DU via a gNB-CU configuration update message. An intended TDD configuration (e.g., an intended TDD downlink (DL)-uplink (UL) configuration) may use a message format associated with a TDD dedicated configuration message. The CU may communicate with other CUs over an Xn interface to exchange information related to the intended TDD configuration.

The CU and the DU communicate information regarding an intended TDD configuration at a cell-specific level. For example, the DU may provide information regarding an intended TDD configuration of a cell rather than of a particular UE. This may avoid excessive overhead associated with communicating UE-specific intended TDD configuration information. Moreover, based at least in part on UEs having relatively low transmit powers, an amount of CLI, associated with UE transmissions, that could be avoided by accounting for a UE-specific intended TDD configuration may not justify the overhead associated with communicating the UE-specific intended TDD configuration. Moreover, based at least in part on UEs being mobile, changing locations, beam directions, and/or beam angles may reduce an effectiveness of CLI-mitigation strategies that may be implemented using UE-specific intended TDD configurations. However, in IAB deployments, DUs may be associated with one or more fixed mobile terminals (MTs), which may be associated with higher transmit powers than are used by UEs. As a result, using cell-specific intended TDD configurations in IAB deployments may result in excessive CLI from the MTs.

Some aspects described herein enable CLI management configuration information to include information regarding a TDD configuration of an MT, such as an intended TDD downlink (DL)-uplink (UL) configuration. For example, a CU may provide, to a DU of the CU, information identifying a TDD configuration of MTs co-located with neighboring IAB-DU cells (e.g., MTs in cells of DUs of CUs that neighbor the CU). In this case, the DU may configure communications within a cell of the DU to avoid CLI with transmissions of MTs in the neighboring IAB-DU cells. Additionally, or alternatively, a DU may provide, to a CU, an intended TDD DL-UL configuration of child IAB-MTs of the DU. In this case, the CU may configure communication (e.g., by the DU, by other DUs of the CU, with one or more DUs, with one or more other CUs, by one or more other CUs and/or DUs thereof) to avoid CLI with the child IAB-MTs of the DU. In this way, the CU and the DU reduce CLI in IAB deployments relative to other IAB deployments that only use cell-specific TDD configuration information.

In this way, wireless nodes, such as a CU or a DU, may communicate intended TDD configuration messages to reduce CLI relative to intended TDD configuration messages that do not have information elements (IEs) described herein. Moreover, the wireless nodes may provide per-TRP configuration information in the TDD configuration messages, thereby enabling different TDD configurations for different TRPs associated with a cell. In this way, the wireless nodes enable improved flexibility in configuring TRPs associated with a cell, thereby improving a utilization of network resources.

Figure 5:
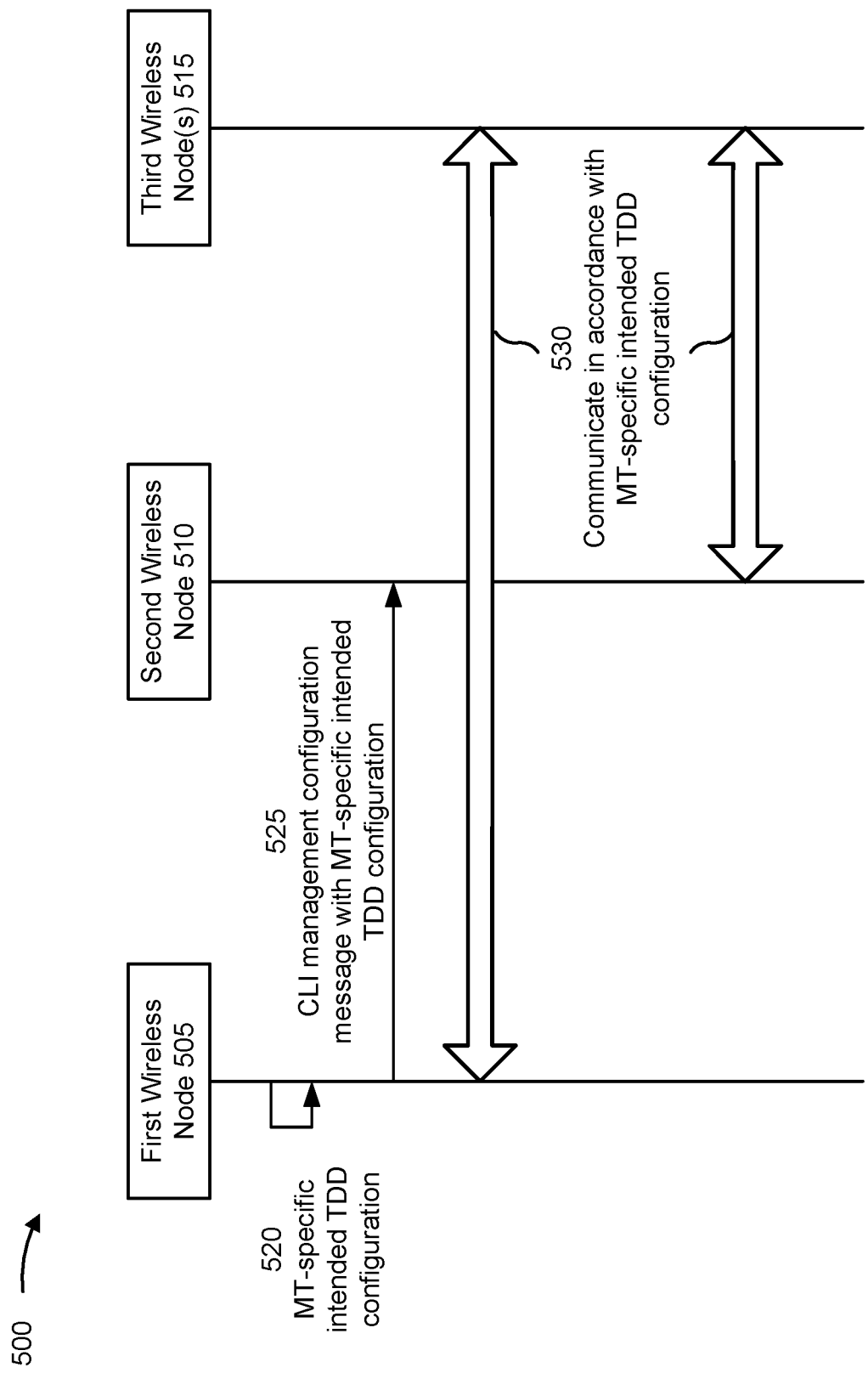
FIG. 5 is a diagram illustrating an example of cross-link interference signaling for integrated access and backhaul, in accordance with the present disclosure.

FIG. 5 is a diagram illustrating an example 500 of TDD DL-UL configuration signaling, in accordance with the present disclosure. As shown in FIG. 5, example 500 includes a first wireless node 505, a second wireless node 510, and one or more third wireless nodes 515.

As further shown in FIG. 5, and by reference number 520, the first wireless node 505 may determine an intended TDD configuration. For example, a DU may determine an intended TDD configuration of an MT of the DU. Additionally, or alternatively, a CU may determine an intended TDD configuration of one or more MTs of one or more neighbor cells of the CU (e.g., one or more cells of a DU of a CU that neighbors the CU). In some aspects, the first wireless node 505 may determine the intended TDD configuration based at least in part on a network traffic characteristic. For example, the first wireless node 505 may schedule one or more symbols as uplink symbols, downlink symbols, and/or flexible symbols, among other examples, for an MT of the first wireless node 505 based at least in part on a level of network traffic for an uplink or a downlink in a cell of the first wireless node 505.

As further shown in FIG. 5, and by reference number 525, the first wireless node 505 may transmit a CLI management configuration message identifying an MT-specific intended TDD configuration. For example, the first wireless node 505 may transmit the CLI management configuration message to the second wireless node 510 via a TDD DL-UL configuration message, a configuration update message, an F1-AP interface message, and/or an Xn interface message, among other examples.

In some aspects, a CU (e.g., the first wireless node 505) may provide information identifying a TDD configuration of one or more MTs co-located with neighboring IAB-DU cells. For example, the CU may provide a TDD dedicated configuration for IAB on a per component carrier basis. Additionally, or alternatively, the CU may provide information identifying one or more resources classified as 'not available' (e.g., one or more resources that are not hard allocated or soft allocated) for the one or more MTs to communicate with respective parent neighboring IAB-DU cells. Additionally, or alternatively, a DU (e.g., the first wireless node 505) may provide a serving cell intended TDD configuration that includes a TDD configuration of one or more IAB-MTs (e.g., child MTs) of the DU, and/or information identifying resources allocated as not available for the one or more IAB-MTs, among other examples.

As further shown in FIG. 5, and by reference number 530, the first wireless node 505 and/or the second wireless node 510 may communicate with one or more third wireless nodes 515 in accordance with the MT-specific intended TDD configuration. For example, the first wireless node 505 may communicate with an MT (e.g., directly or via a DU) and the MT may communicate with one or more UEs 120 based at least in part on the identified MT-specific TDD configuration. Similarly, the second wireless node 510 (e.g., a CU) may communicate and/or may cause one or more other wireless nodes (e.g., another CU, a DU of the CU, a DU of another CU, and/or an MT of another DU) to communicate using a TDD configuration selected to avoid CLI with the identified MT-specific TDD configuration.

As indicated above, FIG. 5 is provided as an example. Other examples may differ from what is described with respect to FIG. 5.

Figure 6:
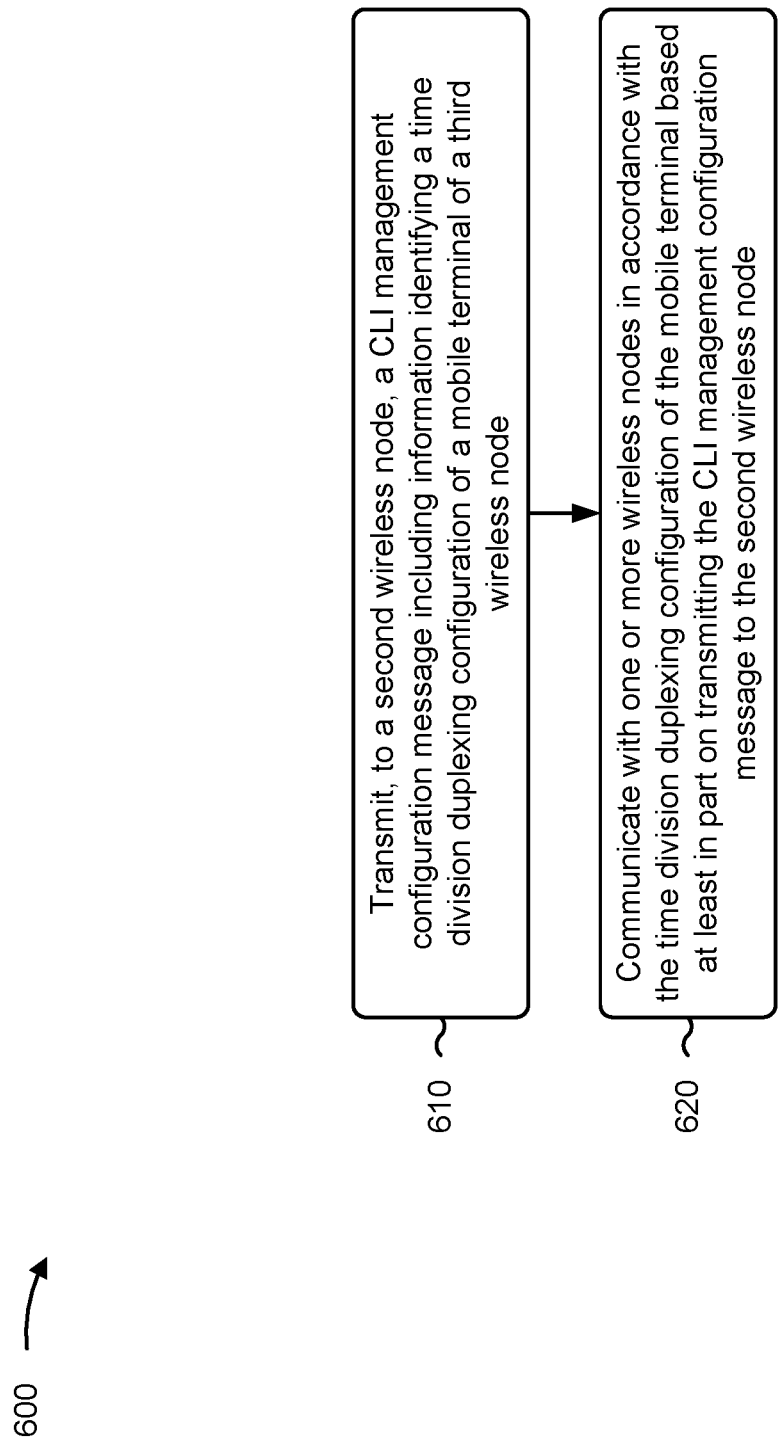
FIG. 6 is a diagram illustrating an example process performed, for example, by a first wireless node, in accordance with the present disclosure.

FIG. 6 is a diagram illustrating an example process 600 performed, for example, by a first wireless node, in accordance with the present disclosure. Example process 600 is an example where the first wireless node (e.g., BS 110, UE 120, and/or the first wireless node 505) performs operations associated with cross-link interference signaling for IAB.

As shown in FIG. 6, in some aspects, process 600 may include transmitting, to a second wireless node, a CLI management configuration message including information identifying a time division duplexing configuration of a mobile terminal of a third wireless node (block 610). For example, the first wireless node (e.g., using controller/processor 240, transmit processor 220, TX MIMO processor 230, MOD 232, antenna 234, controller/processor 280, transmit processor 264, TX MIMO processor 266, MOD 254, and/or antenna 252) may transmit, to a second wireless node, a CLI management configuration message including information identifying a time division duplexing configuration of a mobile terminal of a third wireless node, as described above.

As further shown in FIG. 6, in some aspects, process 600 may include communicating with one or more wireless nodes in accordance with the time division duplexing configuration of the mobile terminal based at least in part on transmitting the CLI management configuration message to the second wireless node (block 620). For example, the first wireless node (e.g., using controller/processor 240, transmit processor 220, TX MIMO processor 230, MOD 232, antenna 234, controller/processor 280, transmit processor 264, TX MIMO processor 266, MOD 254, DEMOD 232, MIMO detector 236, receive processor 238, DEMOD 254, MIMO detector 256, and/or receive processor 258) may communicate with one or more wireless nodes in accordance with the time division duplexing configuration of the mobile terminal based at least in part on transmitting the CLI management configuration message to the second wireless node, as described above.

Process 600 may include additional aspects, such as any single aspect or any combination of aspects described below and/or in connection with one or more other processes described elsewhere herein.

In a first aspect, the first wireless node and the third wireless node are a common wireless node.

In a second aspect, alone or in combination with the first aspect, the first wireless node is different from the third wireless node.

In a third aspect, alone or in combination with one or more of the first and second aspects, the third wireless node is an IAB node and the mobile terminal is an IAB-mobile terminal co-located with the third wireless node.

In a fourth aspect, alone or in combination with one or more of the first through third aspects, the third wireless node is a serving node or parent node of the mobile terminal.

In a fifth aspect, alone or in combination with one or more of the first through fourth aspects, the time division duplexing configuration is identified on a per-component carrier basis.

In a sixth aspect, alone or in combination with one or more of the first through fifth aspects, the CLI management configuration message includes information identifying one or more resources that are not available to the mobile terminal for communication.

In a seventh aspect, alone or in combination with one or more of the first through sixth aspects, the time division duplexing configuration is included in an intended time division duplexing configuration message of a serving cell.

In an eighth aspect, alone or in combination with one or more of the first through seventh aspects, the time division duplexing configuration includes information identifying a time division duplexing configuration of one or more child mobile terminals of the serving cell.

In a ninth aspect, alone or in combination with one or more of the first through eighth aspects, the time division duplexing configuration includes available information indicating whether one or more resources are available or intended to be used by the serving cell or one or more child mobile terminals of the serving cell.

In a tenth aspect, alone or in combination with one or more of the first through ninth aspects, the CLI management configuration message is at least one of: a TDD downlink-uplink (DL-UL) configuration message, a configuration update message, an F1-AP interface message, or an Xn interface message.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
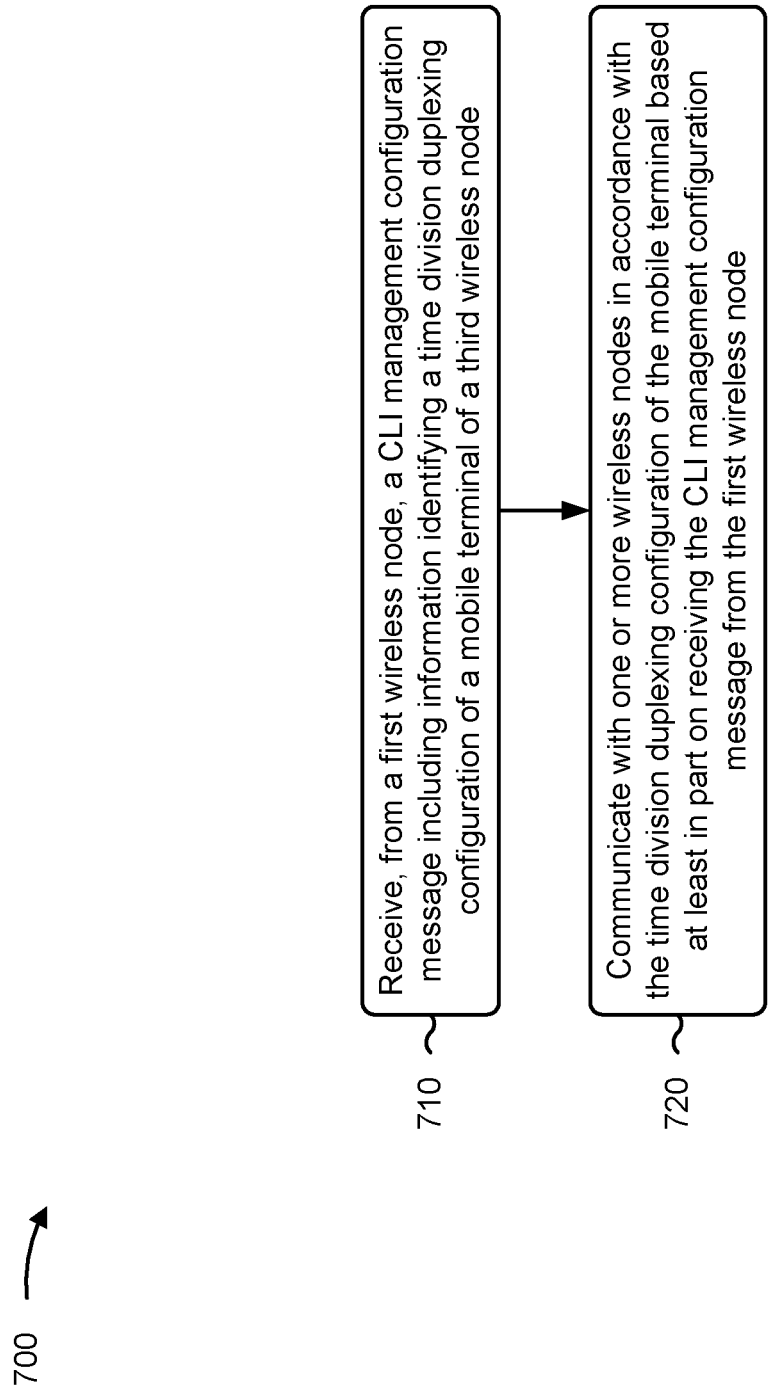
FIG. 7 is a diagram illustrating an example process performed, for example, by a second wireless node, in accordance with the present disclosure.

FIG. 7 is a diagram illustrating an example process 700 performed, for example, by a second wireless node, in accordance with the present disclosure. Example process 700 is an example where the second wireless node (e.g., UE 120, BS 110, and/or the second wireless node 510) performs operations associated with cross-link interference signaling for integrated access and backhaul.

As shown in FIG. 7, in some aspects, process 700 may include receiving, from a first wireless node, a CLI management configuration message including information identifying a time division duplexing configuration of a mobile terminal of a third wireless node (block 710). For example, the second wireless node (e.g., using antenna 234, DEMOD 232, MIMO detector 236, receive processor 238, controller/processor 240, antenna 252, DEMOD 254, MIMO detector 256, receive processor 258, and/or controller/processor 280) may receive, from a first wireless node, a CLI management configuration message including information identifying a time division duplexing configuration of a mobile terminal of a third wireless node, as described above.

As further shown in FIG. 7, in some aspects, process 700 may include communicating with one or more wireless nodes in accordance with the time division duplexing configuration of the mobile terminal based at least in part on receiving the CLI management configuration message from the first wireless node (block 720). For example, the second wireless node (e.g., using controller/processor 240, transmit processor 220, TX MIMO processor 230, MOD 232, antenna 234, controller/processor 280, transmit processor 264, TX MIMO processor 266, MOD 254, DEMOD 232, MIMO detector 236, receive processor 238, DEMOD 254, MIMO detector 256, and/or receive processor 258) may communicate with one or more wireless nodes in accordance with the time division duplexing configuration of the mobile terminal based at least in part on receiving the CLI management configuration message from the first wireless node, as described above.

Process 700 may include additional aspects, such as any single aspect or any combination of aspects described below and/or in connection with one or more other processes described elsewhere herein.

In a first aspect, the first wireless node and the third wireless node are a common wireless node.

In a second aspect, alone or in combination with the first aspect, the first wireless node is different from the third wireless node.

In a third aspect, alone or in combination with one or more of the first and second aspects, the third wireless node is IAB node and the mobile terminal is an IAB-mobile terminal co-located with the third wireless node.

In a fourth aspect, alone or in combination with one or more of the first through third aspects, the third wireless node is a serving node or parent node of the mobile terminal.

In a fifth aspect, alone or in combination with one or more of the first through fourth aspects, the time division duplexing configuration is identified on a per-component carrier basis.

In a sixth aspect, alone or in combination with one or more of the first through fifth aspects, the CLI management configuration message includes information identifying one or more resources that are not available to the mobile terminal for communication.

In a seventh aspect, alone or in combination with one or more of the first through sixth aspects, the time division duplexing configuration is included in an intended time division duplexing configuration message of a serving cell.

In an eighth aspect, alone or in combination with one or more of the first through seventh aspects, the time division duplexing configuration includes information identifying a time division duplexing configuration of one or more child mobile terminals of the serving cell.

In a ninth aspect, alone or in combination with one or more of the first through eighth aspects, the time division duplexing configuration includes available information indicating whether one or more resources are available or intended to be used by the serving cell or one or more child mobile terminals of the serving cell.

In a tenth aspect, alone or in combination with one or more of the first through ninth aspects, the CLI management configuration message is at least one of: a TDD downlink-uplink (DL-UL) configuration message, a configuration update message, an F1-AP interface message, or an Xn interface message.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method of wireless communication performed by a first wireless node, comprising: transmitting, to a second wireless node, a cross-link interference (CLI) management configuration message including information identifying a time division duplexing configuration of a mobile terminal of a third wireless node; and communicating with one or more wireless nodes in accordance with the time division duplexing configuration of the mobile terminal based at least in part on transmitting the CLI management configuration message to the second wireless node.

Aspect 2: The method of Aspect 1, wherein the first wireless node and the third wireless node are a common wireless node.

Aspect 3: The method of Aspect 1, wherein the first wireless node is different from the third wireless node.

Aspect 4: The method of any of Aspects 1-3, wherein the third wireless node is an integrated access and backhaul (IAB) node and the mobile terminal is an IAB-mobile terminal co-located with the third wireless node.

Aspect 5: The method of any of Aspects 1-4, wherein the third wireless node is a serving node or parent node of the mobile terminal.

Aspect 6: The method of any of Aspects 1-5, wherein the time division duplexing configuration is identified on a per-component carrier basis.

Aspect 7: The method of any of Aspects 1-6, wherein the CLI management configuration message includes information identifying one or more resources that are not available to the mobile terminal for communication.

Aspect 8: The method of any of Aspects 1-7, wherein the time division duplexing configuration is included in an intended time division duplexing configuration message of a serving cell.

Aspect 9: The method of Aspect 8, wherein the time division duplexing configuration includes information identifying a time division duplexing configuration of one or more child mobile terminals of the serving cell.

Aspect 10: The method of any of Aspects 8-9, wherein the time division duplexing configuration includes available information indicating whether one or more resources are available or intended to be used by the serving cell or one or more child mobile terminals of the serving cell.

Aspect 11: The method of any of Aspects 1-10, wherein the CLI management configuration message is at least one of: a time division duplexing (TDD) downlink-uplink (DL-UL) configuration message, a configuration update message, an F1-AP interface message, or an Xn interface message.

Aspect 12: A method of wireless communication performed by a second wireless node, comprising: receiving, from a first wireless node, a cross-link interference (CLI) management configuration message including information identifying a time division duplexing configuration of a mobile terminal of a third wireless node; and communicating with one or more wireless nodes in accordance with the time division duplexing configuration of the mobile terminal based at least in part on receiving the CLI management configuration message from the first wireless node.

Aspect 13: The method of Aspect 12, wherein the first wireless node and the third wireless node are a common wireless node.

Aspect 14: The method of Aspect 12, wherein the first wireless node is different from the third wireless node.

Aspect 15: The method of any of Aspects 12-14, wherein the third wireless node is an integrated access and backhaul (IAB) node and the mobile terminal is an IAB-mobile terminal co-located with the third wireless node.

Aspect 16: The method of any of Aspects 12-15, wherein the third wireless node is a serving node or parent node of the mobile terminal.

Aspect 17: The method of any of Aspects 12-16, wherein the time division duplexing configuration is identified on a per-component carrier basis.

Aspect 18: The method of any of Aspects 12-17, wherein the CLI management configuration message includes information identifying one or more resources that are not available to the mobile terminal for communication.

Aspect 19: The method of any of Aspects 12-18, wherein the time division duplexing configuration is included in an intended time division duplexing configuration message of a serving cell.

Aspect 20: The method of Aspect 19, wherein the time division duplexing configuration includes information identifying a time division duplexing configuration of one or more child mobile terminals of the serving cell.

Aspect 21: The method of any of Aspects 19-20, wherein the time division duplexing configuration includes available information indicating whether one or more resources are available or intended to be used by the serving cell or one or more child mobile terminals of the serving cell.

Aspect 22: The method of any of Aspect 12-21, wherein the CLI management configuration message is at least one of: a time division duplexing (TDD) downlink-uplink (DL-UL) configuration message, a configuration update message, an F1-AP interface message, or an Xn interface message.

Aspect 23: An apparatus for wireless communication at a device, comprising a processor; memory coupled with the processor; and instructions stored in the memory and executable by the processor to cause the apparatus to perform the method of one or more Aspects of Aspects 1-11.

Aspect 24: A device for wireless communication, comprising a memory and one or more processors coupled to the memory, the memory and the one or more processors configured to perform the method of one or more Aspects of Aspects 1-11.

Aspect 25: An apparatus for wireless communication, comprising at least one means for performing the method of one or more Aspects of Aspects 1-11.

Aspect 26: A non-transitory computer-readable medium storing code for wireless communication, the code comprising instructions executable by a processor to perform the method of one or more Aspects of Aspects 1-11.

Aspect 27: A non-transitory computer-readable medium storing a set of instructions for wireless communication, the set of instructions comprising one or more instructions that, when executed by one or more processors of a device, cause the device to perform the method of one or more Aspects of Aspects 1-11.

Aspect 28: An apparatus for wireless communication at a device, comprising a processor; memory coupled with the processor; and instructions stored in the memory and executable by the processor to cause the apparatus to perform the method of one or more Aspects of Aspects 12-22.

Aspect 29: A device for wireless communication, comprising a memory and one or more processors coupled to the memory, the memory and the one or more processors configured to perform the method of one or more Aspects of Aspects 12-22.

Aspect 30: An apparatus for wireless communication, comprising at least one means for performing the method of one or more Aspects of Aspects 12-22.

Aspect 31: A non-transitory computer-readable medium storing code for wireless communication, the code comprising instructions executable by a processor to perform the method of one or more Aspects of Aspects 12-22.

Aspect 32: A non-transitory computer-readable medium storing a set of instructions for wireless communication, the set of instructions comprising one or more instructions that, when executed by one or more processors of a device, cause the device to perform the method of one or more Aspects of Aspects 12-22.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first wireless node, comprising:

transmitting, by the first wireless node and to a second wireless node, a configuration message including information identifying a time division duplexing configuration of a mobile terminal that is a child node of a third wireless node that is different from the first wireless node, wherein the configuration message includes information identifying one or more resources that are not available to the mobile terminal for communication, and wherein the time division duplexing configuration of the mobile terminal is a time division duplexing configuration of one or more neighboring integrated access and backhaul distributed unit (IAB-DU) cells; and communicating in accordance with the time division duplexing configuration of the mobile terminal based at least in part on transmitting the configuration message to the second wireless node.

2. The method of claim 1, wherein the third wireless node is an integrated access and backhaul (IAB) node, and wherein the mobile terminal is an IAB-mobile terminal.

3. The method of claim 1, wherein the time division duplexing configuration is identified on a per-component carrier basis.

4. The method of claim 1, wherein the time division duplexing configuration is included in an intended time division duplexing configuration message of a serving cell.

5. The method of claim 4, wherein the time division duplexing configuration includes information identifying a time division duplexing configuration of one or more child mobile terminals of the serving cell.

6. The method of claim 4, wherein the time division duplexing configuration includes available information indicating whether one or more resources are available or intended to be used by the serving cell or one or more child mobile terminals of the serving cell.

7. The method of claim 1, wherein the configuration message is at least one of:
 a time division duplexing (TDD) downlink-uplink (DL-UL) configuration message,
 a configuration update message,
 an F1-AP interface message, or
 an Xn interface message.

8. The method of claim 1, wherein the mobile terminal is an integrated access and backhaul (IAB)-mobile terminal.

9. The method of claim 1, wherein the time division duplexing configuration is a mobile terminal-specific intended time division duplexing configuration.

10. The method of claim 1, wherein the time division duplexing configuration of the one or more neighboring IAB-DU cells is a time division duplexing configuration of one or more mobile terminals co-located with the one or more neighboring IAB-DU cells.

11. The method of claim 1, wherein the first wireless node is an integrated access and backhaul (IAB) donor.

12. A first wireless node for wireless communication, comprising:
 one or more memories; and
 one or more processors, coupled to the one or more memories, configured to cause the first wireless node to:
  transmit, from the first wireless node and to a second wireless node, a configuration message including information identifying a time division duplexing configuration of a mobile terminal that is a child node of a third wireless node that is different from the first wireless node, wherein the configuration message includes information identifying one or more resources that are not available to the mobile terminal for communication, and wherein the time division duplexing configuration of the mobile terminal is a time division duplexing configuration of one or more neighboring integrated access and backhaul distributed unit (IAB-DU cells; and
  communicate in accordance with the time division duplexing configuration of the mobile terminal based at least in part on transmitting the configuration message to the second wireless node.

13. The first wireless node of claim 12, wherein the third wireless node is an integrated access and backhaul (IAB) node, and wherein the mobile terminal is an IAB-mobile terminal.

14. The first wireless node of claim 12, wherein the time division duplexing configuration is identified on a per-component carrier basis.

15. The first wireless node of claim 12, wherein the time division duplexing configuration is included in an intended time division duplexing configuration message of a serving cell.

16. The first wireless node of claim 15, wherein the time division duplexing configuration includes information identifying a time division duplexing configuration of one or more child mobile terminals of the serving cell.

17. The first wireless node of claim 15, wherein the time division duplexing configuration includes available information indicating whether one or more resources are available or intended to be used by the serving cell or one or more child mobile terminals of the serving cell.

18. The first wireless node of claim 12, wherein the configuration message is at least one of:
 a time division duplexing (TDD) downlink-uplink (DL-UL) configuration message,
 a configuration update message,
 an F1-AP interface message, or
 an Xn interface message.

19. The first wireless node of claim 12, wherein the mobile terminal is an integrated access and backhaul (IAB)-mobile terminal.

20. The first wireless node of claim 12, wherein the time division duplexing configuration is a mobile terminal-specific intended time division duplexing configuration.

21. The first wireless node of claim 12, wherein, to communicate in accordance with the time division duplexing configuration, the one or more processors, are configured to cause the first wireless node to:
 communicate, with the third wireless node or the mobile terminal, in accordance with the time division duplexing configuration of the mobile terminal based at least in part on transmitting the configuration message to the second wireless node.

22. The first wireless node of claim 12, wherein the first wireless node is an integrated access and backhaul (IAB) node.

23. The first wireless node of claim 22, wherein the IAB node is an IAB donor.

24. The first wireless node of claim 12, wherein the third wireless node is an integrated access and backhaul (IAB) node.

25. A non-transitory computer-readable medium storing a set of instructions for wireless communication, the set of instructions comprising:
 one or more instructions that, when executed by one or more processors of a first wireless node, cause the first wireless node to:

transmit, from the first wireless node and to a second wireless node, a configuration message including information identifying a time division duplexing configuration of a mobile terminal that is a child node of a third wireless node that is different from the first wireless node, wherein the configuration message includes information identifying one or more resources that are not available to the mobile terminal for communication, and wherein the time division duplexing configuration of the mobile terminal is a time division duplexing configuration of one or more neighboring integrated access and backhaul distributed unit (IAB-DU cells; and communicate in accordance with the time division duplexing configuration of the mobile terminal based at least in part on transmitting the configuration message to the second wireless node.

26. The non-transitory computer-readable medium of claim 25, wherein the time division duplexing configuration is identified on a per-component carrier basis.

27. The non-transitory computer-readable medium of claim 25, wherein the time division duplexing configuration is included in an intended time division duplexing configuration message of a serving cell.

28. A first apparatus for wireless communication, comprising:

means for transmitting, from the first apparatus and to a second apparatus, a configuration message including information identifying a time division duplexing configuration of a mobile terminal that is a child node of a third apparatus that is different from the first apparatus, wherein the configuration message includes information identifying one or more resources that are not available to the mobile terminal for communication, and wherein the time division duplexing configuration of the mobile terminal is a time division duplexing configuration of one or more neighboring integrated access and backhaul distributed unit (IAB-DU) cells; and means for communicating in accordance with the time division duplexing configuration of the mobile terminal based at least in part on transmitting the configuration message to the second apparatus.

29. The first apparatus of claim 28, wherein the time division duplexing configuration is identified on a per-component carrier basis.

30. The first apparatus of claim 28, wherein the time division duplexing configuration is included in an intended time division duplexing configuration message of a serving cell.

31. The first apparatus of claim 28, wherein the mobile terminal is an integrated access and backhaul (IAB)-mobile terminal.

* * * * *